(12) United States Patent
Minagawa et al.

(10) Patent No.: US 11,634,889 B2
(45) Date of Patent: Apr. 25, 2023

(54) CONTROL DEVICE AND CONTROL METHOD

(71) Applicant: Komatsu Ltd., Tokyo (JP)

(72) Inventors: Masanori Minagawa, Tokyo (JP); Yasuhiro Ohyama, Tokyo (JP); Qi Ding, Tokyo (JP)

(73) Assignee: Komatsu Ltd., Tokyo (JP)

( * ) Notice: Subject to any disclaimer, the term of this patent is extended or adjusted under 35 U.S.C. 154(b) by 730 days.

(21) Appl. No.: 16/614,854

(22) PCT Filed: Oct. 3, 2018

(86) PCT No.: PCT/JP2018/037056
§ 371 (c)(1),
(2) Date: Nov. 19, 2019

(87) PCT Pub. No.: WO2019/069983
PCT Pub. Date: Apr. 11, 2019

(65) Prior Publication Data
US 2020/0208374 A1 Jul. 2, 2020

(30) Foreign Application Priority Data
Oct. 4, 2017 (JP) ............................. JP2017-194689

(51) Int. Cl.
*E02F 9/20* (2006.01)
*G05D 1/00* (2006.01)
*G05D 1/02* (2020.01)

(52) U.S. Cl.
CPC ............ *E02F 9/2033* (2013.01); *E02F 9/205* (2013.01); *E02F 9/2045* (2013.01); *G05D 1/0038* (2013.01); *G05D 1/0214* (2013.01); *G05D 2201/0202* (2013.01)

(58) Field of Classification Search
CPC ....... E02F 9/2033; E02F 9/2045; E02F 9/205; E02F 9/2054; G05D 1/0038; G05D 1/0214; G05D 2201/0202
USPC .......................................................... 701/50
See application file for complete search history.

(56) References Cited

U.S. PATENT DOCUMENTS

| 2009/0043462 A1* | 2/2009 | Stratton | E02F 9/26 |
| | | | 701/50 |
| 2012/0130582 A1* | 5/2012 | Hukkeri | B60W 50/14 |
| | | | 701/25 |
| 2016/0253853 A1 | 9/2016 | Yamamoto et al. | |
| 2017/0061796 A1* | 3/2017 | Osagawa | G08G 1/163 |

FOREIGN PATENT DOCUMENTS

| CN | 104737182 A | 6/2015 |
| JP | H07-150594 A | 6/1995 |
| JP | 2012-021290 A | 2/2012 |
| JP | 2016-089389 A | 5/2016 |

(Continued)

*Primary Examiner* — Muhammad Shafi
(74) *Attorney, Agent, or Firm* — Locke Lord LLP

(57) ABSTRACT

A control device that controls a work vehicle including work equipment includes: a route acquisition unit that acquires a traveling route of a transport vehicle; an area setting unit that sets a limit area for limiting entry of the work equipment along the traveling route; and a signal output unit that outputs a signal for controlling the work vehicle or the transport vehicle on the basis of a relationship between the limit area and the work equipment.

8 Claims, 10 Drawing Sheets

(56) References Cited

FOREIGN PATENT DOCUMENTS

| | | | |
|---|---|---|---|
| JP | 2016089389 | * | 5/2016 |
| JP | 2018-024997 A | | 2/2018 |
| WO | 2016/013687 A1 | | 1/2016 |

* cited by examiner

FIG. 9

|  | HEIGHT IS WITHIN AREA | HEIGHT IS OUTSIDE AREA |
|---|---|---|
| WITHIN AREA IN PLAN VIEW | ·STOP TRANSPORT VEHICLE<br>·PROHIBIT SWING<br>·PROHIBIT LOWERING OF WORK EQUIPMENT | ·PROHIBIT LOWERING OF WORK EQUIPMENT |
| OUTSIDE AREA IN PLAN VIEW | ·PROHIBIT SWING IN DIRECTION TOWARD INSIDE OF AREA | NO LIMIT |

CONTROL DEVICE AND CONTROL METHOD

TECHNICAL FIELD

The present invention relates to a control device and a control method for controlling a work vehicle or a transport vehicle at a work site at which the work vehicle and the transport vehicle are provided.

Priority is claimed on Japanese Patent Application No. 2017-194689, filed on Oct. 4, 2017, the content of which is incorporated herein by reference.

BACKGROUND ART

Patent Document 1 discloses a technique of detecting an entering object which enters into a work area of a work vehicle and limiting a swing operation of work equipment on the basis of a position of the detected entering object.

CITATION LIST

Patent Literature

[Patent Document 1] Japanese Unexamined Patent Application, First Publication No. 2012-21290

DISCLOSURE OF INVENTION

Technical Problem

On the other hand, when the work equipment is located near a stop position of the transport vehicle, the swing operation is not limited only by the control described in Patent Document 1. As a result, an operator of the work vehicle operates the work vehicle while considering the transport vehicle, and this may cause a decrease in productivity. For this reason, it is desirable to control the work equipment or the transport vehicle before the transport vehicle enters into the work area of the work vehicle.

An aspect of the present invention is to provide a control device and a control method for controlling the work equipment or the transport vehicle such that the work equipment and the transport vehicle do not come into contact with each other.

Solution to Problem

According to a first aspect of the present invention, there is provided a control device that controls a work vehicle including work equipment, the control device including: a route acquisition unit that acquires a traveling route of a transport vehicle; an area setting unit that sets a limit area for limiting entry of the work equipment along the traveling route; and a signal output unit that outputs a signal for controlling the work vehicle or the transport vehicle on the basis of a relationship between the limit area and the work equipment.

Advantageous Effects of Invention

According to the aspect, the control device can control the work equipment or the transport vehicle such that the work equipment and the transport vehicle do not come into contact with each other.

BRIEF DESCRIPTION OF DRAWINGS

FIG. 9 is a diagram showing a relationship between a position of a bucket and a limit according to the first embodiment.

BEST MODE FOR CARRYING OUT THE INVENTION

First Embodiment

<<Remote Operation System>>

Figure 1:
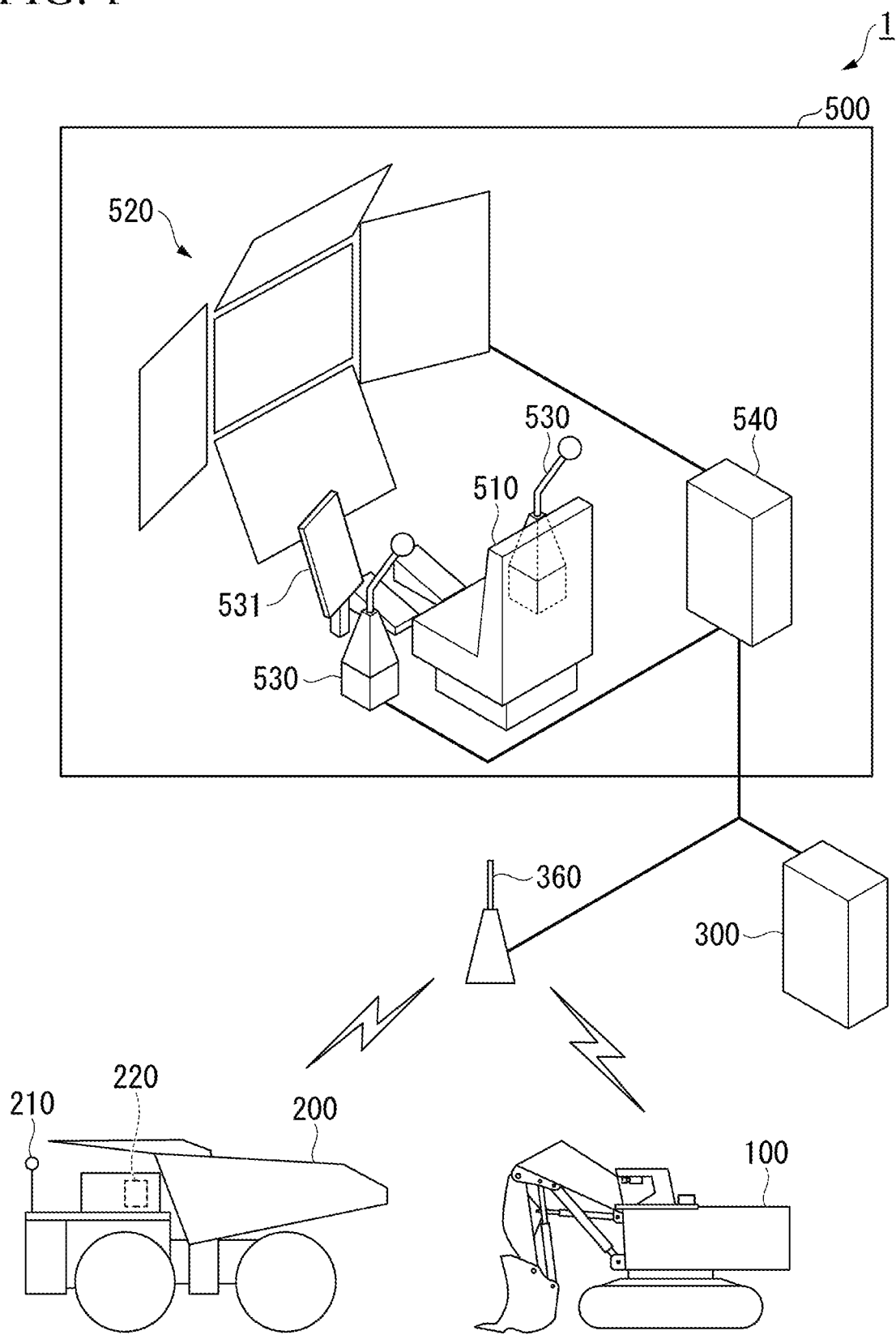
FIG. 1 is a schematic diagram showing a configuration of a remote operation system according to a first embodiment.

FIG. 1 is a schematic diagram showing a configuration of a work system according to a first embodiment.

The work system 1 includes a work vehicle 100 that is operated by a remote operation, one or more transport vehicles 200, a management apparatus 300, and a remote operation room 500 that remotely operates the work vehicle 100.

The transport vehicle 200 performs unmanned traveling on the basis of course data (for example, speed information, coordinates to be followed by the unmanned transport vehicle) received from the management apparatus 300. The transport vehicle 200 and the management apparatus 300 are connected to each other by communication via an access point 360. The management apparatus 300 acquires a position and an azimuth direction of the transport vehicle 200 from the transport vehicle 200, and generates course data used for traveling of the transport vehicle 200 on the basis of the position and the azimuth direction of the transport vehicle 200. The management apparatus 300 transmits the course data to the transport vehicle 200. The transport vehicle 200 performs unmanned traveling on the basis of the received course data. That is, the work system 1 includes an unmanned conveyance system including the transport vehicle 200 and the management apparatus 300. Although the work system 1 according to the first embodiment includes an unmanned conveyance system, in another embodiment, some or all of the transport vehicles may be manned vehicles. In this case, the management apparatus 300 acquires a position and an azimuth direction of the transport vehicle even though there is no need to transmit course data and instructions for loading.

The work vehicle 100 is remotely operated on the basis of an operation signal transmitted from the remote operation room 500. The work vehicle 100 and the remote operation room 500 are connected to each other by communication via the access point 360. A control device 540 of the remote operation room 500 receives an operation of the work vehicle 100 from an operator, and transmits an operation signal to the work vehicle 100. The work vehicle 100 operates according to the operation signal received from the remote operation room 500. That is, the work system 1 includes a remote operation system including the work vehicle 100 and the remote operation room 500.

The work vehicle 100 and the transport vehicle 200 are provided at a work site (for example, a mine, a quarry, or the like). The remote operation room 500 is provided at a place away from the work vehicle 100 and the transport vehicle 200 (for example, a city, a place in a work site, or the like).

<<Transport Vehicle>>

The transport vehicle 200 according to the first embodiment is an offload dump truck including a vessel. The transport vehicle 200 according to another embodiment may be a transport vehicle other than a dump truck.

The transport vehicle 200 includes a position and azimuth direction calculator 210 and a control device 220. The position and azimuth direction calculator 210 calculates a position and an azimuth direction of the transport vehicle 200. The position and azimuth direction calculator 210 includes two receivers that receive positioning signals from satellites of a global navigation satellite system (GNSS). As an example of the GNSS, a global positioning system (GPS) may be used. The two receivers are respectively provided at different positions of the transport vehicle 200. The position and azimuth direction calculator 210 calculates the position of the transport vehicle 200 in a work site coordinate system on the basis of the positioning signals received by the receivers. The position and azimuth direction calculator 210 calculates the azimuth direction of a facing direction of the transport vehicle 200, as a relationship between a position of one receiver and a position of the other receiver, using each of the positioning signals received by the two receivers. In another embodiment, the configuration is not limited thereto. For example, the transport vehicle 200 may include an inertial measurement unit (IMU), and may calculate the azimuth direction on the basis of a measurement result of the inertial measurement unit. In this case, a drift of the inertial measurement unit may be corrected on the basis of a traveling trajectory of the transport vehicle 200. In the case of calculating the azimuth direction using the inertial measurement unit, the transport vehicle 200 may include a calculation device.

The control device 220 transmits the position and the azimuth direction detected by the position and azimuth direction calculator 210 to the management apparatus 300. The control device 220 receives, from the management apparatus 300, the course data and an earth removal instruction, an instruction of approach to a loading point P3, and an instruction of start from the loading point P3. The control device 220 causes the transport vehicle 200 to travel on the basis of the received course data or causes the vessel of the transport vehicle 200 to be raised or lowered according to the earth removal instruction.

<<Work Vehicle>>

Figure 2:
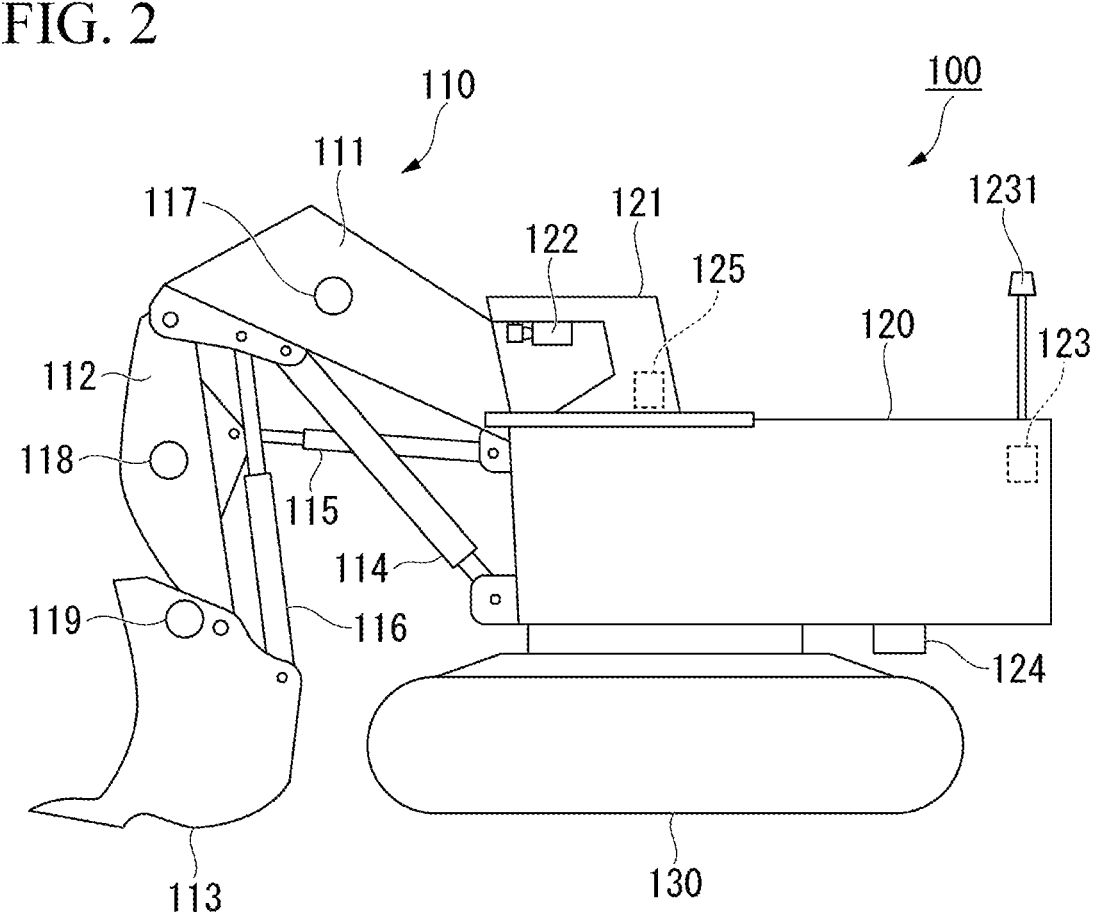
FIG. 2 is an external view of a remote work vehicle according to the first embodiment.

FIG. 2 is an external view of the work vehicle according to the first embodiment.

The work vehicle 100 according to the first embodiment is a hydraulic shovel. The work vehicle 100 according to another embodiment may be a work vehicle other than a hydraulic shovel.

The work vehicle 100 includes work equipment 110 that is operated by hydraulic pressure, a swing body 120 that supports the work equipment 110, and a traveling body 130 that supports the swing body 120.

The work equipment 110 includes a boom 111, an arm 112, a bucket 113, a boom cylinder 114, an arm cylinder 115, a bucket cylinder 116, a boom angle sensor 117, an arm angle sensor 118, and a bucket angle sensor 119.

A base end portion of the boom 111 is attached to a front end portion of the swing body 120 via a pin.

The arm 112 connects the boom 111 and the bucket 113. A base end portion of the arm 112 is attached to a front end portion of the boom 111 via a pin.

The bucket 113 includes a blade for excavating earth and sand and a container for conveying the excavated earth and sand. A base end portion of the bucket 113 is attached to a front end portion of the arm 112 via a pin.

The boom cylinder 114 is a hydraulic cylinder for operating the boom 111. A base end portion of the boom cylinder 114 is attached to the swing body 120. A front end portion of the boom cylinder 114 is attached to the boom 111.

The arm cylinder 115 is a hydraulic cylinder for driving the arm 112. A base end portion of the arm cylinder 115 is attached to the boom 111. A front end portion of the arm cylinder 115 is attached to the arm 112.

The bucket cylinder 116 is a hydraulic cylinder for driving the bucket 113. A base end portion of the bucket cylinder 116 is attached to the boom 111. A front end portion of the bucket cylinder 116 is attached to the bucket 113.

The boom angle sensor 117 is attached to the boom 111, and detects a tilt angle of the boom 111.

The arm angle sensor 118 is attached to the arm 112, and detects a tilt angle of the arm 112.

The bucket angle sensor 119 is attached to the bucket 113, and detects a tilt angle of the bucket 113.

Each of the boom angle sensor 117, the arm angle sensor 118, and the bucket angle sensor 119 according to the first embodiment detects a tilt angle with respect to a ground plane. The angle sensors according to another embodiment are not limited thereto, and may respectively detect tilt angles with respect to another reference plane. For example, in another embodiment, the angle sensors may respectively detect relative angles with respect to attached portions as reference planes, or may respectively detect tilt angles by measuring strokes of the cylinders and converting the strokes of the cylinders into angles.

An operation room 121 is provided on the swing body 120. An imaging device 122 is provided at an upper portion of the operation room 121. The imaging device 122 is provided at a forward and upward portion in the operation room 121. The imaging device 122 captures an image in front of the operation room 121 via a windshield at a front surface of the operation room 121. Examples of the imaging device 122 include, for example, an imaging device using a charge coupled device (CCD) sensor or a complementary metal oxide semiconductor (CMOS) sensor. In another embodiment, the imaging device 122 may not necessarily be provided in the operation room 121, and the imaging device 122 may be provided at a position at which at least a work target and the work equipment 110 may be imaged.

The work vehicle 100 includes the imaging device 122, a position and azimuth direction calculator 123, a tilt measurement device 124, and a control device 125.

The position and azimuth direction calculator 123 calculates a position of the swing body 120 and an azimuth direction of the facing direction of the swing body 120. The position and azimuth direction calculator 123 includes two receivers 1231 that receive positioning signals from satellites of the GNSS. The two receivers 1231 are respectively provided at different positions of the swing body 120. The position and azimuth direction calculator 123 detects a position of a representative point of the swing body 120 in a work site coordinate system (the swing center of the swing body 120) on the basis of the positioning signals received by the receivers 1231.

The position and azimuth direction calculator 123 calculates the azimuth direction of the facing direction of the swing body 120, as a relationship between a position of one receiver 1231 and a position of the other receiver 1231, using each of the positioning signals received by the two receivers 1231.

The tilt measurement device 124 measures acceleration and angular velocity of the swing body 120, and detects a posture (for example, a roll angle, a pitch angle, and a yaw angle) of the swing body 120 on the basis of the measurement result. The tilt measurement device 124 is provided, for example, on a lower surface of the swing body 120. As the tilt measurement device 124, for example, an inertial measurement unit (IMU) may be used.

The control device 125 transmits the image captured by the imaging device 122, the swing speed, the position, and the azimuth direction of the swing body 120, the tilt angles of the boom 111, the arm 112, and the bucket 113, the traveling speed of the traveling body 130, and the posture of the swing body 120, to the remote operation room 500. Hereinafter, the image, the swing speed, the position, and the azimuth direction of the swing body 120, the tilt angles of the boom 111, the arm 112, and the bucket 113, the traveling speed of the traveling body 130, and the posture of the swing body 120 are also referred to as vehicle information. The vehicle information according to another embodiment is not limited thereto. For example, the vehicle information according to another embodiment may not include any of the swing speed, the position, the azimuth direction, the tilt angle, the traveling speed, and the posture, may include a value detected by another sensor, or may include a value calculated from the detected value.

The control device 125 receives an operation signal from the remote operation room 500. The control device 540 operates the work equipment 110, the swing body 120, or the traveling body 130 on the basis of the received operation signal.

<<Management Apparatus>>

Figure 3:
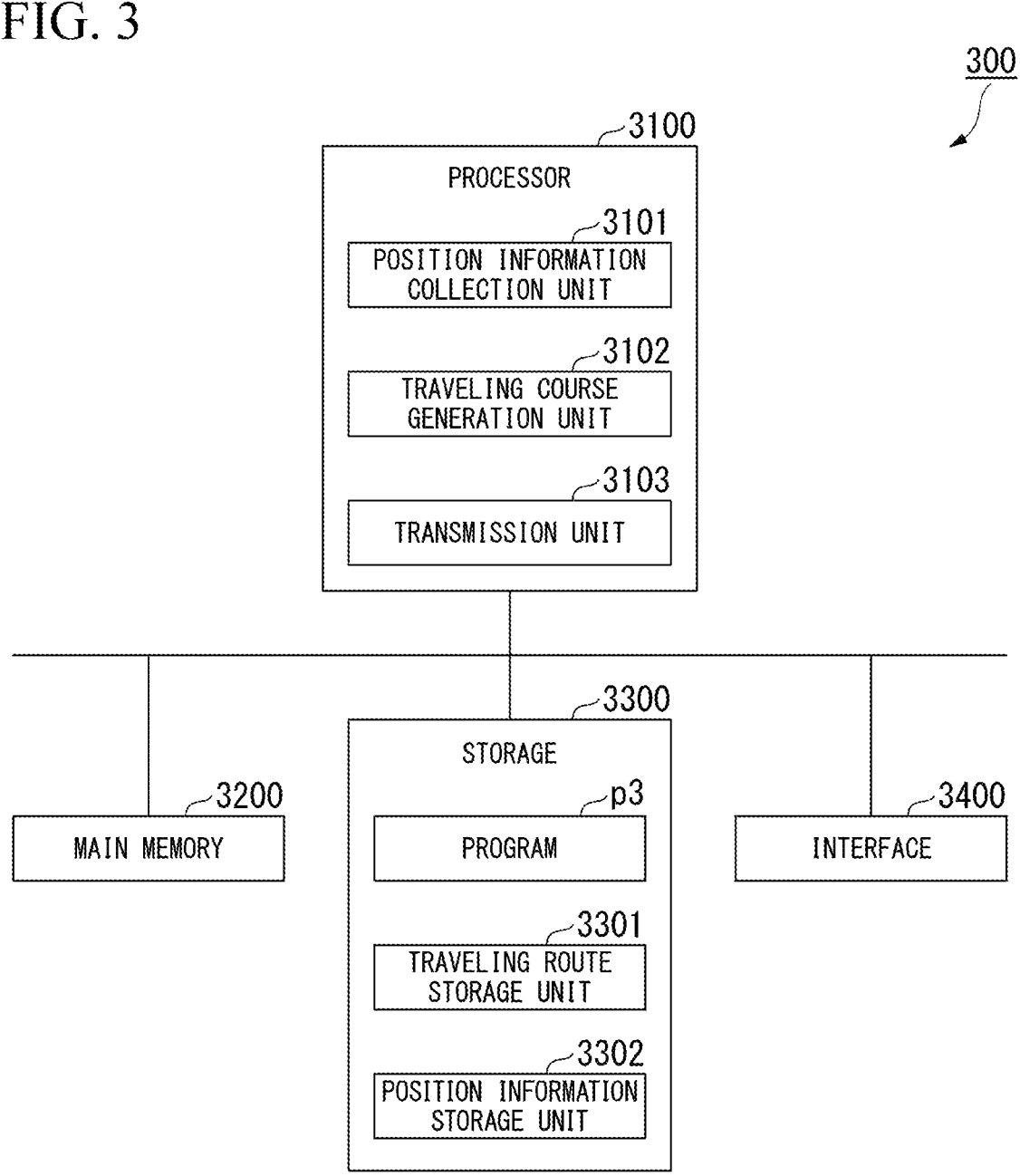
FIG. 3 is a schematic block diagram showing a configuration of a management apparatus according to the first embodiment.

FIG. 3 is a schematic block diagram showing a configuration of the management apparatus according to the first embodiment.

The management apparatus 300 manages traveling of the transport vehicle 200.

The management apparatus 300 is a computer including a processor 3100, a main memory 3200, a storage 3300, and an interface 3400. The storage 3300 stores a program p3. The processor 3100 reads the program p3 from the storage 3300, loads the program p3 in the main memory 3200, and executes processing according to the program p3. The management apparatus 300 is connected to a network via the interface 3400.

The storage 3300 includes storage areas as a traveling route storage unit 3301 and a position information storage unit 3302. Examples of the storage 3300 include a hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like. The storage 3300 may be an internal medium directly connected to a common communication line of the management apparatus 300, or may be an external medium connected to the management apparatus 300 via the interface 3400. The storage 3300 is a non-temporary tangible storage medium.

Figure 4:
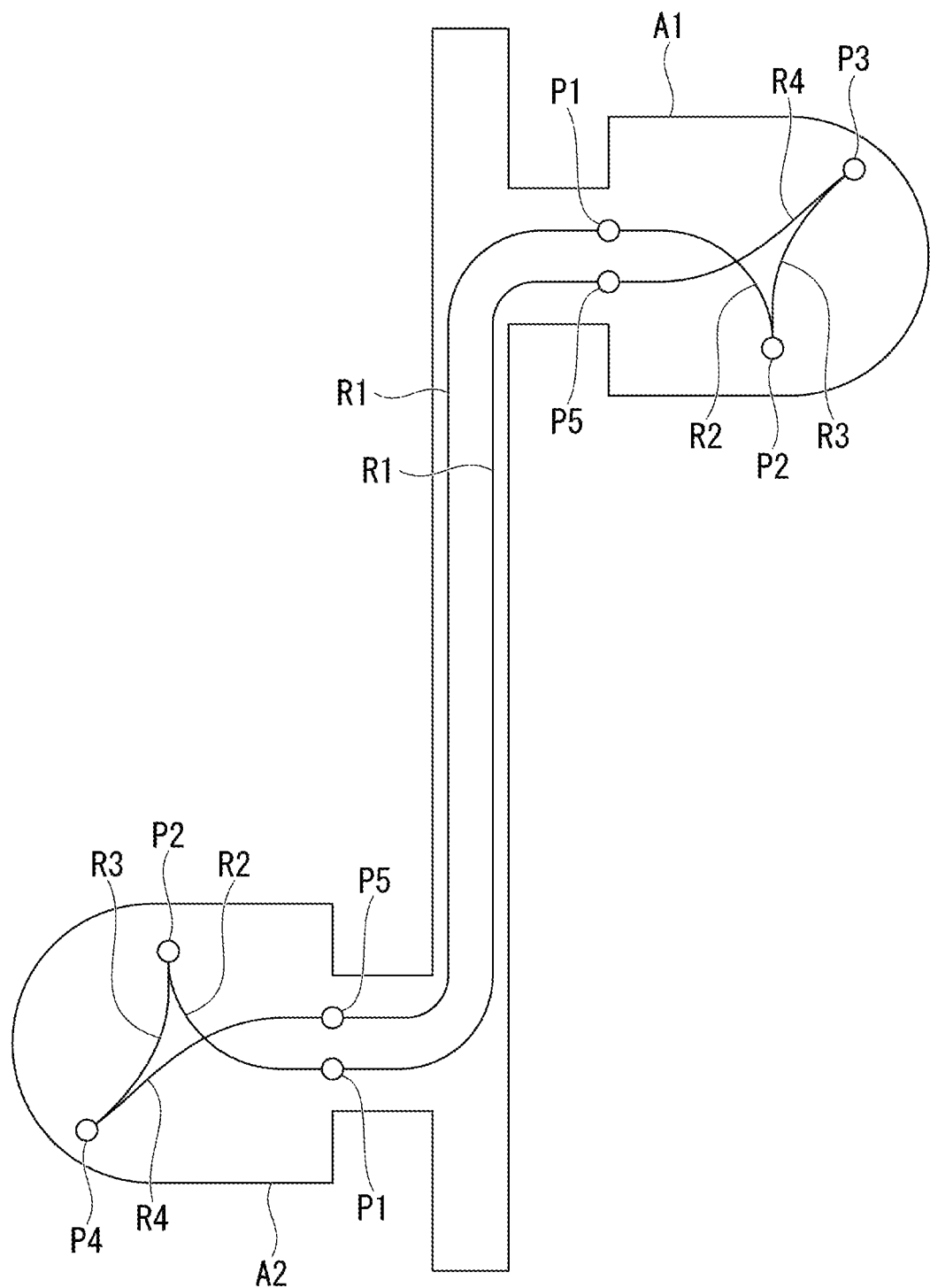
FIG. 4 is a diagram showing an example of a traveling route.

FIG. 4 is a diagram showing an example of a traveling route.

The traveling route storage unit 3301 stores a traveling route R for each transport vehicle 200. The traveling route R includes a predetermined connection route R1 connecting two areas A (for example, a loading place A1 and an earth removal place A2), an entry route R2, an approach route R3, and an exit route R4 which are routes in the area A. The entry route R2 is a route connecting a standby point P1 as one end of the connection route R1 and a predetermined turning point P2 in the area A. The approach route R3 is a route connecting the turning point P2 and a loading point P3 or an earth removal point P4 in the area A. The exit route R4 is a route connecting the loading point P3 or the earth removal point P4 and an exit point P5 as the other end of the connection route R1 in the area A. The loading point P3 is a point which is set by an operation of the operator of the work vehicle 100. The turning point P2 is a point which is set by the management apparatus 300 according to the position of the loading point P3. The management apparatus 300 receives a loading point instruction signal for specifying a coordinate of the loading point P3 from an operator, and sets the loading point P3 according to the loading point instruction signal. The management apparatus 300 calculates an entry route R2, an approach route R3, and an exit route R4 each time the loading point P3 is set.

The position information storage unit 3302 stores position information and azimuth direction information of each transport vehicle 200.

The processor 3100 includes a position information collection unit 3101, a traveling course generation unit 3102, and a transmission unit 3103 by an execution of the program p3.

The position information collection unit 3101 receives position information and azimuth direction information of the transport vehicle 200 from the transport vehicle 200 via the access point 360. The position information collection unit 3101 causes the position information storage unit 3302 to store the received position information and the received azimuth direction information.

The traveling course generation unit 3102 generates course data indicating an area in which movement of the transport vehicle 200 is permitted on the basis of the traveling route stored in the traveling route storage unit 3301 and the position information and the azimuth direction information stored in the position information storage unit 3302, and transmits the course data to the transport vehicle 200. The course data is, for example, information indicating an area in which the transport vehicle 200 can travel at a predetermined speed within a predetermined time and which does not overlap with the traveling route of another transport vehicle 200. In a case where a stop signal of the transport vehicle 200 is received from the remote operation room 500, the traveling course generation unit 3102 transmits the stop signal to the transport vehicle 200.

The transmission unit 3103 transmits the position information of the transport vehicle 200 collected by the position information collection unit 3101 to the remote operation room 500. The transmission unit 3103 receives an operation signal of the transport vehicle 200 from the remote operation room 500, and transmits the operation signal to the transport vehicle 200 via the access point 360. The operation signal of the transport vehicle 200 includes an entry instruction signal, a loading completion signal, and a traveling restart signal. The entry instruction signal is a signal for instructing the transport vehicle 200 to enter to the loading point P3. The loading completion signal is a signal for instructing the transport vehicle 200 to exit from the loading point P3 when loading is completed. The traveling restart signal is a signal for releasing stop of the transport vehicle 200.

<<Remote Operation Room>>

The remote operation room 500 includes a driver's seat 510, a display device 520, a first operation device 530, a second operation device 531, and a control device 540.

The display device 520 is disposed in front of the driver's seat 510. The display device 520 is located in front of the operator's eyes when the operator sits on the driver's seat 510. The display device 520 may be configured with a plurality of displays arranged side by side as shown in FIG. 1, or may be configured with one large display. Further, the display device 520 may a device that projects an image on a curved surface or a spherical surface by a projector or the like.

The first operation device 530 is an operation device for the remote operation system. The first operation device 530 receives an input of an operation signal of the boom cylinder 114, an operation signal of the arm cylinder 115, an operation signal of the bucket cylinder 116, an operation signal for left swing or right swing of the swing body 120, or an operation signal for forward traveling or backward traveling of the traveling body 130. The first operation device 530 is configured with, for example, an electric lever and an electric pedal.

The second operation device 531 is an operation device for the unmanned conveyance system. The second operation device 531 receives an input of a loading point instruction signal, an entry instruction signal, a loading completion signal, or a traveling restart signal of the transport vehicle 200. The second operation device 531 is configured with, for example, a touch panel. The second operation device 531 transmits the input operation signal to the management apparatus 300.

The first operation device 530 and the second operation device 531 are disposed in the vicinity of the driver's seat 510. The first operation device 530 and the second operation device 531 are located within an operable range of the operator when the operator sits on the driver's seat 510.

The control device 540 causes the display device 520 to display the image (for example, a moving image) received from the work vehicle 100, and transmits an operation signal indicating an operation of the first operation device 530 to the work vehicle 100.

Figure 5:
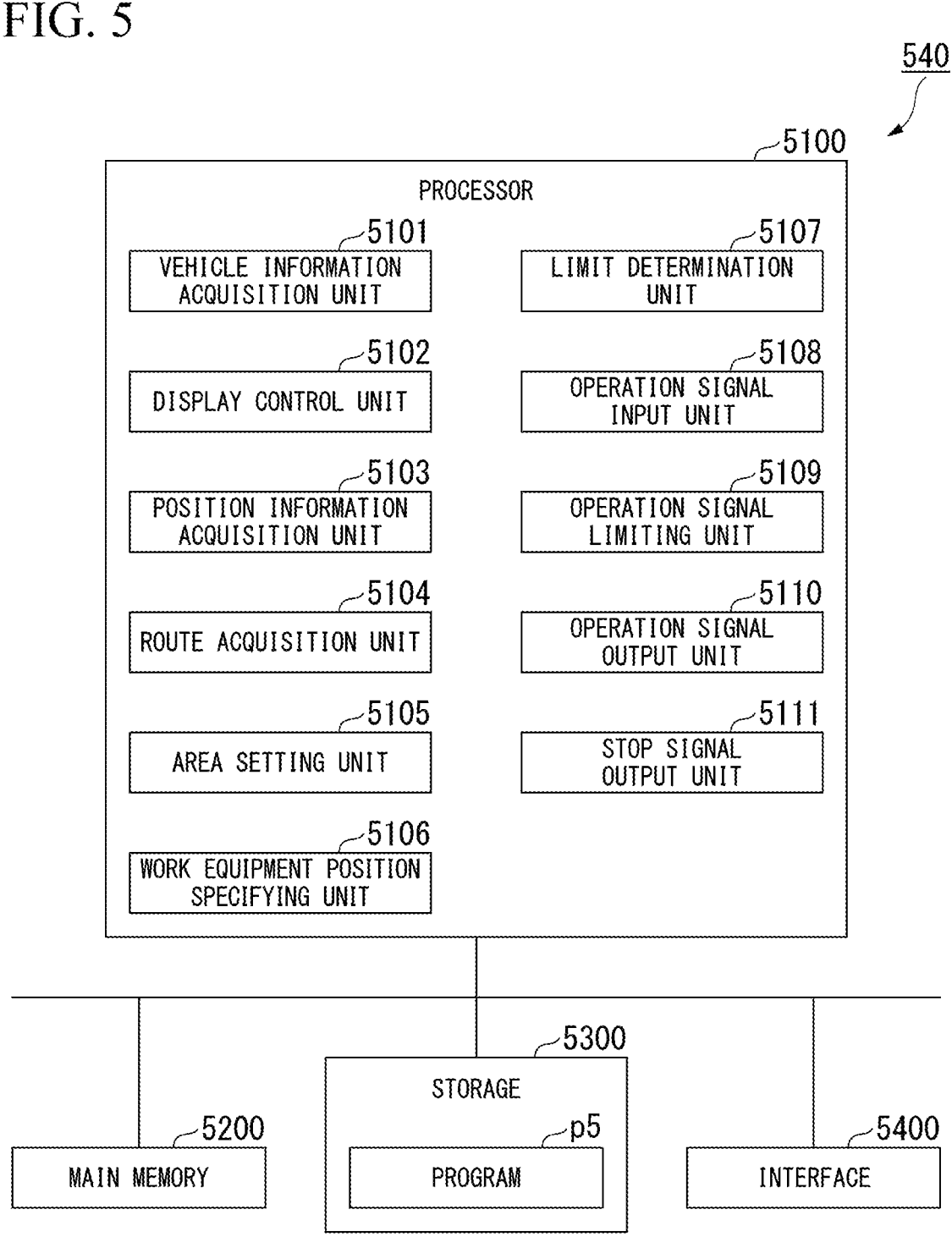
FIG. 5 is a schematic block diagram showing a configuration of a control device of a remote operation room according to the first embodiment.

FIG. 5 is a schematic block diagram showing a configuration of the control device of the remote operation room according to the first embodiment.

The control device 540 is a computer including a processor 5100, a main memory 5200, a storage 5300, and an interface 5400. The storage 5300 stores a program p5. The processor 5100 reads the program p5 from the storage 5300, loads the program p5 in the main memory 5200, and executes processing according to the program p5. The control device 540 is connected to the network via the interface 5400.

Examples of the storage 5300 include an HDD, an SSD, a magnetic disk, a magneto-optical disk, a CD-ROM, a DVD-ROM, a semiconductor memory, and the like. The storage 5300 may be an internal medium directly connected to a common communication line of the control device 540, or may be an external medium connected to the control device 540 via the interface 5400. The storage 5300 is a non-temporary tangible storage medium.

The processor 5100 includes a vehicle information acquisition unit 5101, a display control unit 5102, a position information acquisition unit 5103, a route acquisition unit 5104, an area setting unit 5105, a work equipment position specifying unit 5106, a limit determination unit 5107, an operation signal input unit 5108, an operation signal limiting unit 5109, an operation signal output unit 5110, and a stop signal output unit 5111 by an execution of the program p5.

The vehicle information acquisition unit 5101 acquires vehicle information from the work vehicle 100 via the access point 360.

The display control unit 5102 generates a display signal for displaying an image included in the vehicle information received by the vehicle information acquisition unit 5101, and outputs the display signal to the display device 520.

The position information acquisition unit 5103 acquires a position of each transport vehicle 200 from the management apparatus 300.

The route acquisition unit 5104 acquires a traveling route of each transport vehicle 200 from the management apparatus 300.

Figure 6:
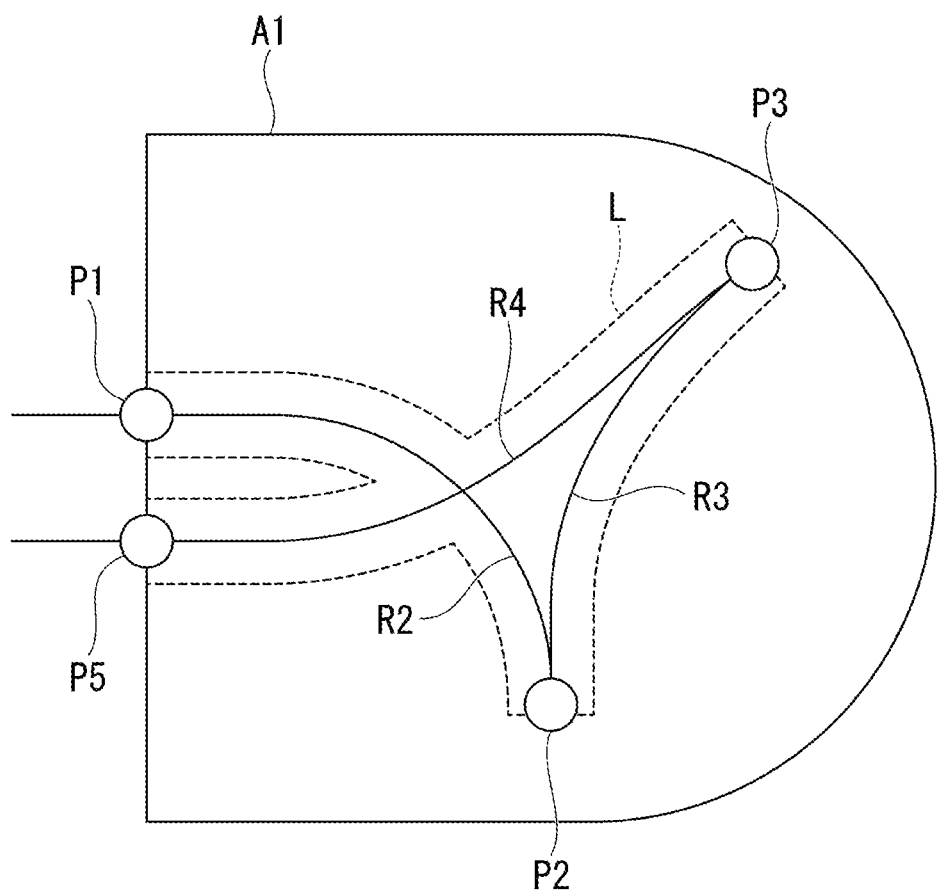
FIG. 6 is a diagram showing an example of a limit area.
Figure 7:
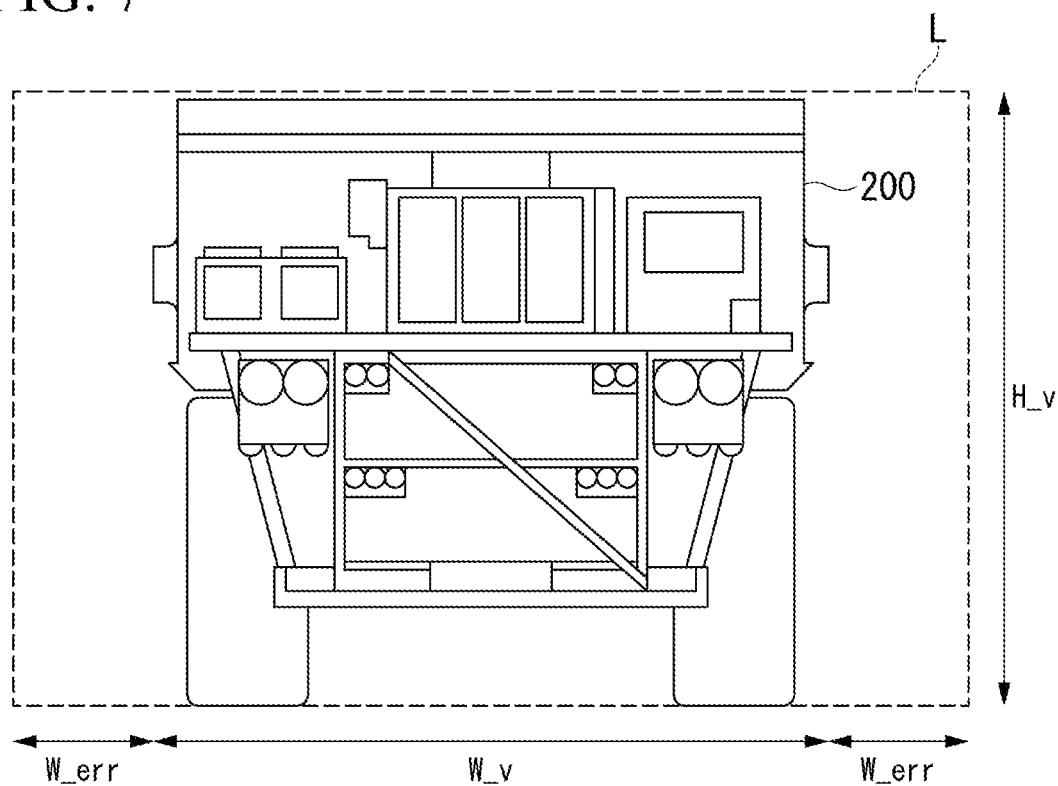
FIG. 7 is a diagram showing an example of a section of the limit area.

The area setting unit 5105 sets a limit area L for limiting the entry of the work vehicle 100 on the basis of the traveling route acquired by the route acquisition unit 5104. FIG. 6 is a diagram showing an example of a limit area. FIG. 7 is a diagram showing an example of a section of the limit area. The limit area L is a space extending along the traveling route R (the entry route R2, the approach route R3, and the exit route R4) in the loading place A1, and is a space having a section determined from a height H_v of the transport vehicle 200 and a width obtained by adding a predetermined width W err (an error in automatic operation) to a width W_v of the transport vehicle 200. The limit area L is a space on the basis of the shovel coordinate system. That is, the area setting unit 5105 converts the traveling route R, which is acquired by the route acquisition unit 5104 on the basis of the vehicle information acquired by the vehicle information acquisition unit 5101, from the work site coordinate system to the shovel coordinate system, and sets the limit area L on the basis of the converted traveling route R. In another embodiment, the predetermined width may not be an error in automatic operation. Further, in another embodiment, the traveling route R may be converted from the shovel coordinate system to the work site coordinate system, or may be converted from the shovel coordinate system to a track coordinate system.

The work equipment position specifying unit 5106 specifies a position of the bottom point of the bucket 113 on the basis of the vehicle information received by the vehicle information acquisition unit 5101. The position of the bottom point of the bucket 113 is a position on the basis of the shovel coordinate system of the work vehicle 100. Specifically, the work equipment position specifying unit 5106 obtains a vertical component and a horizontal component of a length of the boom 111 on the basis of the tilt angle of the boom 111 and a known length of the boom 111. Similarly, the work equipment position specifying unit 5106 obtains a vertical component and a horizontal component of a length of the arm 112. The work equipment position specifying unit 5106 specifies a position separated from the position of the work vehicle 100 by a sum of the vertical components of the lengths of the boom 111 and the arm 112 and a sum of the horizontal components of the lengths of the boom 111 and the arm 112, in a direction specified from the azimuth direction and the posture of the work vehicle 100, as a position of the front end of the arm 112. The work equipment position specifying unit 5106 specifies the bottom point of the bucket 113 in the vertical direction on the basis of the position of the front end of the arm 112, and the tilt angle and the known shape of the bucket 113.

The limit determination unit 5107 determines whether or not the position of the bottom point of the bucket 113 is located within the limit area or immediately above the limit area, and whether or not the height of the bottom point of the bucket 113 is equal to or higher than the height of the limit area.

The operation signal input unit 5108 receives an input of an operation signal from the first operation device 530. Examples of the operation signal include an operation signal of the boom cylinder 114, an operation signal of the arm cylinder 115, an operation signal of the bucket cylinder 116, an operation signal for left swing or right swing of the swing body 120, and an operation signal for forward traveling or backward traveling of the traveling body 130.

The operation signal limiting unit 5109 limits the operation signal which is input to the operation signal input unit 5108, on the basis of a determination result of the limit determination unit 5107. Specifically, in a case where the limit determination unit 5107 determines that the position of the bottom point of the bucket 113 is located within or immediately above the limit area, the operation signal limiting unit 5109 cancels the operation signal for operating the boom 111, the arm 112, and the bucket 113 in a downward direction, and maintains the position of the bottom point of the bucket 113. At this time, the operation signal limiting unit 5109 generates an operation signal for operating the boom cylinder 114, the arm cylinder 115, and the bucket cylinder 116 such that the position of the bottom point of the bucket 113 is not lowered due to the own weight of the work equipment 110. The operation signal limiting unit 5109 may contract only the boom cylinder 114, may contract only the arm cylinder 115, or may control both of the boom cylinder 114 and the arm cylinder 115. In addition, in a case where the limit determination unit 5107 determines that the height of the bottom point of the bucket 113 is lower than the height of the limit area, the operation signal limiting unit 5109 cancels the operation signal for swing the swing body 120 in a direction toward the inside of the limit area.

The operation signal output unit 5110 outputs the operation signal which is input to the operation signal input unit 5108 or the operation signal which is limited by the operation signal limiting unit 5109, to the work vehicle 100.

In a case where the limit determination unit 5107 determines that the position of the bottom point of the bucket 113 is located within the limit area, the stop signal output unit 5111 outputs a stop signal for stopping the transport vehicle 200 to the management apparatus 300.

<<Method>>

Figure 8:
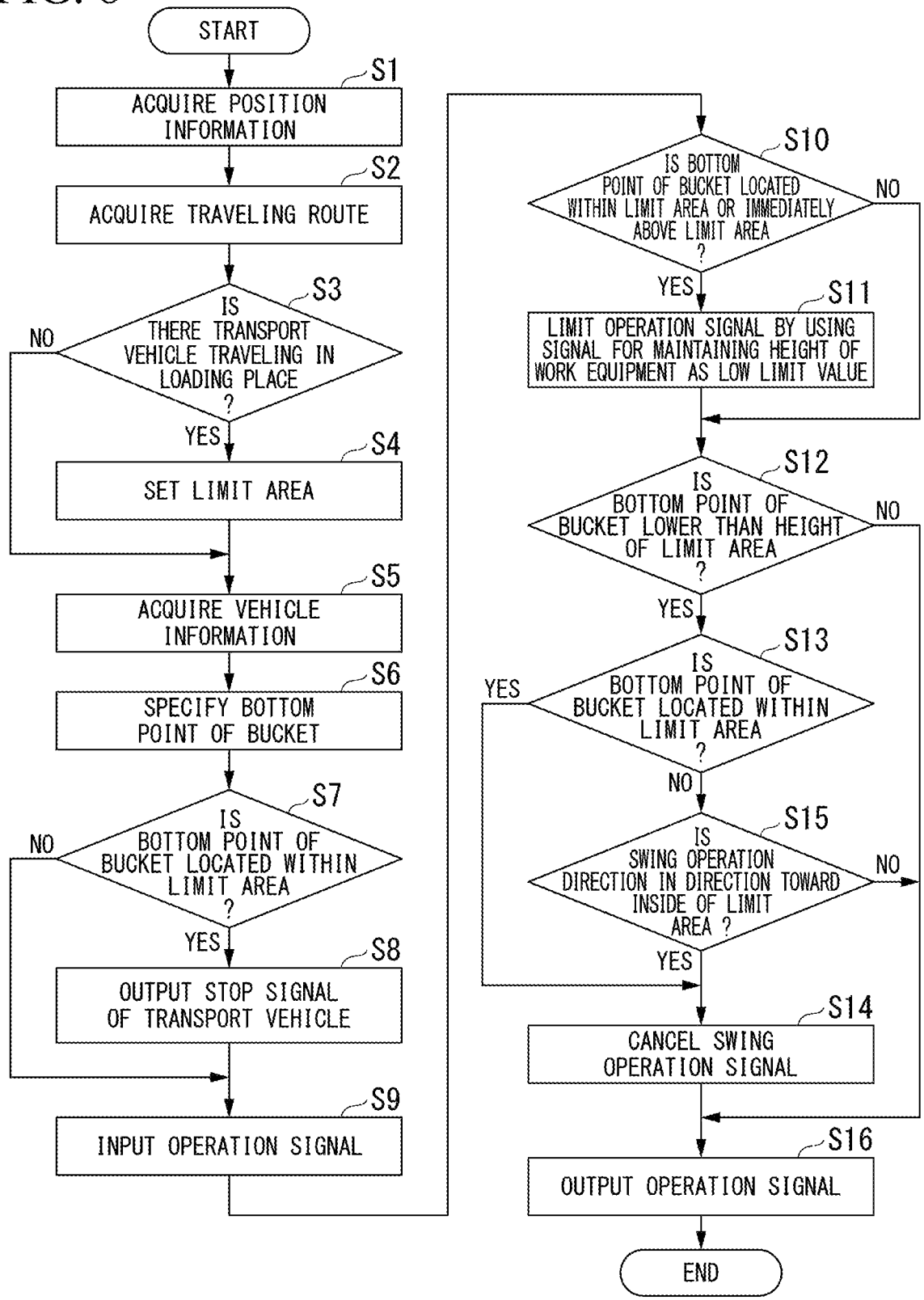
FIG. 8 is a flowchart showing a method of setting the limit area by the control device of the remote operation room according to the first embodiment.

FIG. 8 is a flowchart showing a method of setting the limit area by the control device of the remote operation room according to the first embodiment.

The control device 540 executes setting processing of the limit area shown in FIG. 8 at regular time intervals.

The position information acquisition unit 5103 acquires position information of the work vehicle 100 and the plurality of transport vehicles 200, from the management apparatus 300 (step S1). In addition, the route acquisition unit 5104 acquires a traveling route R of each transport vehicle 200 from the management apparatus 300 (step S2). The area setting unit 5105 determines whether or not there is a transport vehicle 200 traveling in the loading place A1 among the plurality of transport vehicles 200 (step S3).

In a case where there is a transport vehicle 200 traveling in the loading place A1 (YES in step S3), the area setting unit 5105 sets a limit area L on the basis of the traveling route R associated with the transport vehicle 200 traveling in the loading place A1 among the traveling routes R acquired in step S2 (step S4). At this time, in a case where a plurality of transport vehicles 200 travel in the loading place A1, the area setting unit 5105 sets the limit area L for each transport vehicle 200. At this time, the area setting unit 5105 does not set the limit area L for the transport vehicle 200 which is located in the loading place A1 but does not travel (for example, the transport vehicle 200 stopped at the loading point P3).

For example, the area setting unit 5105 determines a height and a width of the limit area L on the basis of the height of the transport vehicle 200 and the width obtained by adding an error in automatic operation to the width of the transport vehicle 200. The area setting unit 5105 determines, as a limit area L, an area including a trajectory obtained by moving a rectangle having the determined height and width along the traveling route R in the loading place A1. In another embodiment, a section of the limit area L is not limited to a rectangle. For example, a section of the limit area L according to another embodiment may have another shape such as a trapezoid or a semicircle.

Thereby, the control device 540 can set the limit area L in the loading place A1.

In a case where the area setting unit 5105 sets the limit area L (step S4), or in a case where there is no transport vehicle 200 traveling in the loading place A1 (NO in step S3), the vehicle information acquisition unit 5101 acquires vehicle information from the work vehicle 100 via the access point 360 (step S5). The work equipment position specifying unit 5106 specifies the position of the bottom point of the bucket 113 on the basis of the acquired vehicle information (step S6).

The limit determination unit 5107 determines whether or not the position of the bottom point of the bucket 113 is located within the limit area L (step S7). In a case where the position of the bottom point of the bucket 113 is located within the limit area L (YES in step S7), the stop signal output unit 5111 transmits a stop signal for stopping the transport vehicle 200 associated with the limit area, to the management apparatus 300 (step S8). When receiving the stop signal, the management apparatus 300 outputs the stop signal to the transport vehicle 200 as a stop target. Thereby, the transport vehicle 200 is stopped. While receiving the stop signal, the management apparatus 300 outputs an operation signal for stopping the transport vehicle 200. Thereafter, when a traveling restart signal is input to the second operation device 531 by an operation of the operator and the management apparatus 300 transmits the traveling restart signal to the transport vehicle 200, the transport vehicle 200 restarts traveling according to the course data. In another embodiment, when receiving a deceleration signal from the management apparatus 300, the transport vehicle 200 may be decelerated on the course.

In a case where the position of the bottom point of the bucket 113 is not within the limit area L (NO in step S7), or in a case where the stop signal output unit 5111 outputs a stop signal, the operation signal input unit 5108 receives an input of the operation signal from the first operation device 530 (step S9).

The limit determination unit 5107 determines whether or not the position of the bottom point of the bucket 113 is located within the limit area or immediately above the limit area (step S10). That is, the limit determination unit 5107 determines whether or not the bottom point of the bucket 113 is present within the limit area in plan view when viewed from above.

In a case where the position of the bottom point of the bucket 113 is located within the limit area or immediately above the limit area (YES in step S10), the operation signal limiting unit 5109 limits the operation signal for extending or contracting the cylinders of the work equipment 110 among the input operation signals, by using, as a low limit value, a signal for maintaining the height of the work equipment 110 (step S11). The signal for maintaining the height of the work equipment 110 is an operation signal for canceling downward movement of the work equipment 110 due to the own weight of the work equipment 110. Here, it is assumed that a value of the operation signal for moving the work equipment 110 in a downward direction (excavation direction) is a negative number, and that a value of the operation signal for moving the work equipment 110 in an upward direction (dump direction) is a positive number. In this case, it is assumed that the value of the signal for maintaining the height of the work equipment 110 is a negative number close to zero. For example, the boom 111 is raised when the boom cylinder 114 is extended. Thus, the value of the operation signal for extending the boom cylinder 114 is a positive number, and the value of the operation signal for contracting the boom cylinder 114 is a negative number. That is, the operation signal of the boom cylinder 114 that is for maintaining the height of the work equipment 110 is a signal for minutely extending the boom cylinder 114.

Therefore, in a case where the input operation signal is a signal for moving the work equipment 110 in the upward direction, the operation signal limiting unit 5109 passes the operation signal. In a case where the input operation signal is not a signal for moving the work equipment 110 or in a case where the input operation signal is a signal for moving the work equipment 110 in the downward direction, the operation signal limiting unit 5109 limits the value of the operation signal to a value of the signal for maintaining the height of the work equipment 110.

In a case where the operation signal limiting unit 5109 limits the operation signal, or in a case where the bottom point of the bucket 113 is not located within the limit area or immediately above the limit area (NO in step S10), the limit determination unit 5107 determines whether or not the height of the bottom point of the bucket 113 is lower than the height of the limit area (step S12). In a case where the height of the bottom point of the bucket 113 is lower than the height of the limit area (YES in step S12), the limit determination unit 5107 determines whether or not the position of the bottom point of the bucket 113 is located within the limit area L (step S13). In a case where the position of the bottom point of the bucket 113 is located within the limit area L (YES in step S13), the operation signal limiting unit 5109 cancels, among the input operation signals, the swing operation signal for swing the swing body 120 (step S14). That is, the operation signal limiting unit 5109 prohibits the swing operation of the work vehicle 100 by limiting the swing operation signal to zero. In another embodiment, the operation signal limiting unit 5109 may decelerate the swing operation of the work vehicle 100 by limiting the swing operation signal.

In a case where the position of the bottom point of the bucket 113 is not located in the limit area L (NO in step S13), the limit determination unit 5107 determines whether or not the input swing operation signal is a signal indicating a swing operation in a direction toward the inside of the limit area L, that is, a swing operation in a direction close to the limit area L (step S15). In a case where the swing operation signal is a swing operation in a direction toward the inside of the limit area L, the operation signal limiting unit 5109 cancels, among the input operation signals, the swing operation signal for swing the swing body 120 (step S14).

On the other hand, in a case where the height of the bottom point of the bucket 113 is equal to or higher than the height of the limit area (NO in step S12), or in a case where the position of the bottom point of the bucket 113 is not located within the limit area L and the swing operation signal is a signal indicating a swing operation in a direction toward the outside of the limit area L (NO in step S15), the operation signal limiting unit 5109 passes the swing operation signal.

When the operation signal limiting unit 5109 determines the necessity of cancel of the swing operation signal, the operation signal output unit 5110 outputs the operation signal limited by the operation signal limiting unit 5109 (the input operation signal in a case where limiting is not performed in step S11 and step S13), to the work vehicle 100 via the management apparatus 300 (step S16).

FIG. 9 is a diagram showing a relationship between a position of the bucket and a limit according to the first embodiment.

By the setting processing of the limit area, operations of the work vehicle 100 and the transport vehicle 200 are limited as follows.

In a case where the bottom point of the bucket 113 is within the limit area L, that is, in a case where the bottom point of the bucket 113 is located within the limit area L in plan view when viewed from above and the height of the bottom point is lower than the height of the limit area L, the transport vehicle 200 is stopped in step S8, lowering of the work equipment 110 is prohibited in step S11, and swing is prohibited in step S14.

In addition, when the bottom point of the bucket 113 is not within the limit area L, in a case where the bottom point of the bucket 113 is located within the limit area L in plan view when viewed from above, lowering of the work equipment 110 is prohibited in step S11.

In addition, when the bottom point of the bucket 113 is not within the limit area L, in a case where the height of the bottom point is lower than the height of the limit area L, swing in a direction toward the inside of the limit area L is prohibited in step S14.

In a case where the bottom point of the bucket 113 is located outside the limit area L in plan view when viewed from above and the height of the bottom point is equal to or higher than the height of the limit area L, operations of the work vehicle 100 and the transport vehicle 200 are not limited.

<<Operation and Effect>>

According to the first embodiment, the control device 540 sets the limit area L along the traveling route R of the transport vehicle 200, and outputs a signal for controlling the work vehicle 100 or the transport vehicle 200 on the basis of the relationship between the limit area L and the work equipment 110. Thereby, the control device 540 can control the work vehicle 100 such that the work equipment 110 is not located on the traveling route R of the transport vehicle 200. Further, in a case where the work equipment 110 is located on the traveling route R of the transport vehicle 200, the control device 540 can stop traveling of the transport vehicle 200. Accordingly, the control device 540 can control the work vehicle 100 or the transport vehicle 200 such that the work equipment 110 and the transport vehicle 200 do not come into contact with each other.

Further, according to the first embodiment, in a case where the bottom point of the work equipment 110 is located within the limit area L or immediately above the limit area L, the control device 540 limits an operation of moving the work equipment 110 in the downward direction. In addition, in a case where the height of the bottom point of the work equipment 110 is lower than the height of the limit area L, the control device 540 limits a swing operation of the work equipment 110. That is, as shown in FIG. 9, the control device 540 according to the first embodiment limits an operation for moving the work equipment 110 in a direction toward the inside of the limit area L. Thereby, it is possible to prompt the operator to move the work equipment 110 toward the outside of the limit area L.

Further, according to the first embodiment, in a case where the bottom point of the work equipment 110 is located within the limit area L, the control device 540 outputs a stop signal for stopping the transport vehicle 200. Thereby, the control device 540 can prevent the transport vehicle 200 from traveling toward the work equipment 110 when the work equipment 110 is located on the traveling route R.

Further, according to the first embodiment, in a case where the transport vehicle 200 is located in the loading place A1 at which the work vehicle 100 is present, the control device 540 outputs a signal on the basis of the relationship between the limit area L and the work equipment 110. Thereby, in a case where the work vehicle 100 and the transport vehicle 200 are sufficiently separated from each other and thus a possibility that the work vehicle 100 and the transport vehicle 200 come into contact with each other is low, the control device 540 can prevent unnecessary limit from being applied.

Second Embodiment

The control device 540 according to the first embodiment prompts the operator to move the work equipment 110 toward the outside of the limit area L by limiting an operation for moving the work equipment 110 toward the inside of the limit area L. On the other hand, in a case where a part of the work equipment 110 is located within the limit area L, the control device 540 according to a second embodiment automatically moves the work equipment 110 toward the outside of the limit area L.

Figure 10:
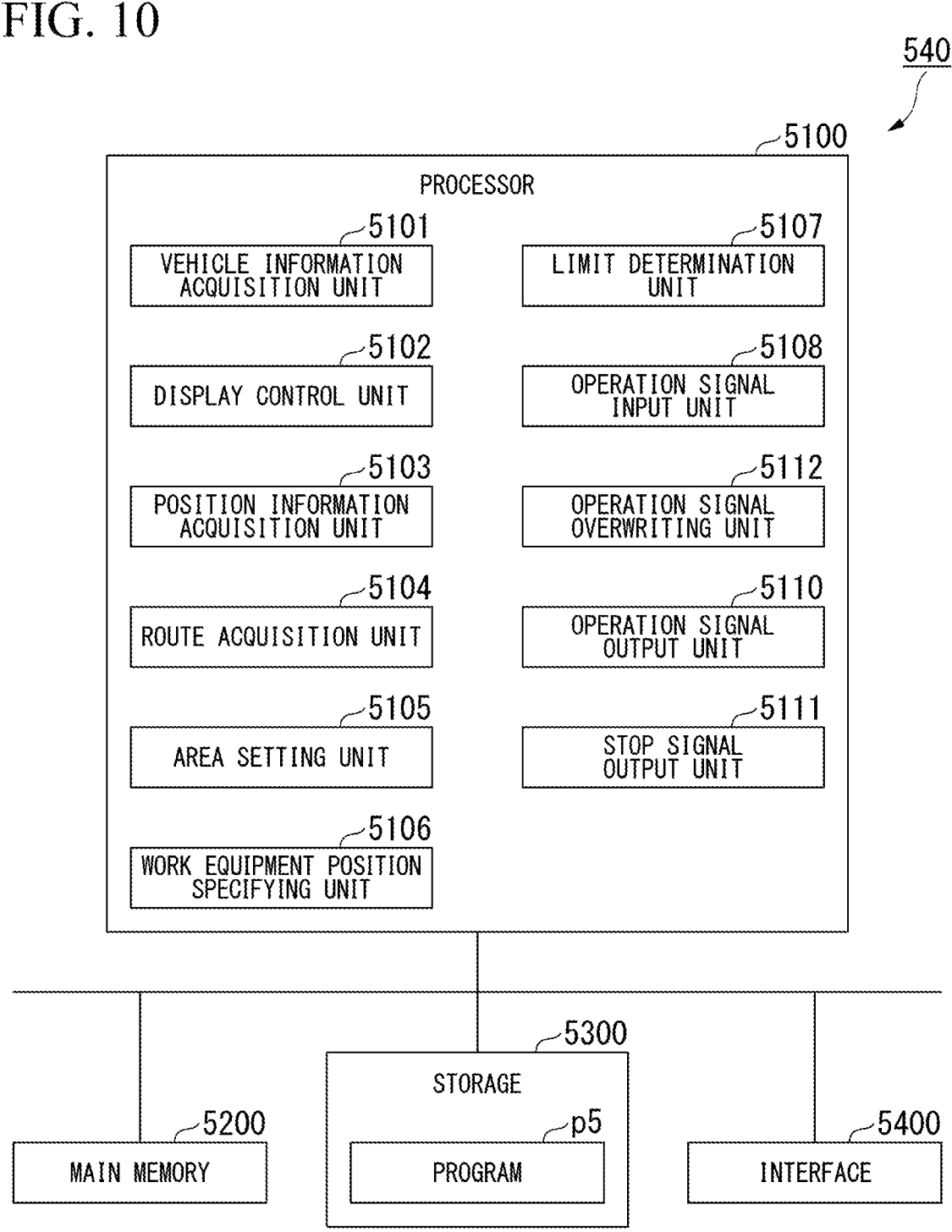
FIG. 10 is a schematic block diagram showing a configuration of the control device of the remote operation room according to a second embodiment.

FIG. 10 is a schematic block diagram showing a configuration of the control device of the remote operation room according to the second embodiment.

The control device 540 according to the second embodiment includes an operation signal overwriting unit 5112 instead of the operation signal limiting unit 5109.

In a case where the bottom point of the work equipment 110 is located within the limit area L, the operation signal overwriting unit 5112 overwrites the operation signal which is input to the operation signal input unit 5108, with an operation signal for moving the work equipment 110 toward the outside of the limit area L. That is, in a case where the bottom point of the work equipment 110 is located within the limit area L, the operation signal overwriting unit 5112 automatically generates an operation signal for moving the work equipment 110 in the upward direction.

Thereby, the control device 540 according to the second embodiment can quickly evacuate the work equipment 110 from the traveling route R of the transport vehicle 200 such that the work equipment 110 and the transport vehicle 200 do not come into contact with each other.

Other Embodiments

As described above, although an embodiment has been described in detail with reference to the drawings, a specific configuration is not limited to the embodiment, and various design changes may be made.

For example, in the work system 1 according to the embodiment, although the control device 540 of the remote operation room 500 controls the work vehicle 100 or the transport vehicle 200 on the basis of the relationship between the limit area L and the work equipment 110, the present invention is not limited thereto. For example, in another embodiment, the management apparatus 300 may control the work vehicle 100 or the transport vehicle 200 on the basis of the relationship between the limit area L and the work equipment 110. In addition, in another embodiment, the control device 125 of the work vehicle 100 may control the work vehicle 100 on the basis of the relationship between the limit area L and the work equipment 110.

Further, although the limit area L according to the embodiment is a three-dimensional area having a width and a height, the present invention is not limited thereto. For example, the limit area L according to another embodiment may be a two-dimensional area with no height. In this case, the control device 540 compares the position of the bucket 113 with the position of the limit area L in plan view when viewed from above.

In the embodiment, although communication between the work vehicle 100 and the transport vehicle 200 and communication between the management apparatus 300 and the remote operation room 500 are connected via one access point 360, the present invention is not limited thereto. For example, in another embodiment, an access point used for communication between the work vehicle 100 and the transport vehicle 200 and an access point used for communication between the management apparatus 300 and the remote operation room 500 may be independently provided.

In the work system 1 according to the embodiment, although the control device 540 of the remote operation room 500 limits an operation signal, the present invention is not limited thereto. For example, in the work system 1 according to another embodiment, the control device 125 of the work vehicle 100 may limit the operation signal received from the remote operation room 500 on the basis of the position information of the transport vehicle 200 that is stored in the management apparatus 300. In this case, the program p5 is stored in the storage of the control device 125.

In the work system 1 according to the embodiment, although whether to limit an operation signal on the basis of the limit area L is determined depending on whether or not the transport vehicle 200 is located in the loading place A1, the present invention is not limited thereto. For example, in the work system 1 according to another embodiment, whether to limit an operation signal on the basis of the limit area L may be determined on the basis of whether or not a distance between the transport vehicle 200 and the work vehicle 100 is within a predetermined distance. That is, in the work system 1 according to another embodiment, whether to limit an operation signal on the basis of the limit area L may be determined on the basis of an area having a radius of a predetermined distance when the position of the work vehicle 100 is set as the center. In addition, in another embodiment, in a case where the transport vehicle 200 does not arrive at the loading place A1, when the distance between the transport vehicle 200 and the work vehicle 100 is within a predetermined distance, the operator may be alerted by, for example, a warning sound which is generated by the remote operation room 500 on the basis of the limit area L.

In the work system 1 according to the embodiment, an operation signal is limited on the basis of the limit area L, which is set on the basis of the position information of the transport vehicle 200, the position information being collected by the management apparatus 300; however, the present invention is not limited thereto. For example, in the work system 1 according to another embodiment, an operation signal may be limited on the basis of the limit area L, which is obtained on the basis of a distance measurement result by a sensor of the work vehicle 100 or image recognition of the imaging device 122 of the work vehicle 100.

In the work system 1 according to the embodiment, during a period for which the transport vehicle 200 travels in the loading place A1, an operation signal is limited on the basis of the limit area L; however, the present invention is not limited thereto. For example, in the work system 1 according to another embodiment, during a period from a time when the transport vehicle 200 stops at the loading point P3 to a time when the transport vehicle 200 starts, in order to reduce impact on the vessel of the transport vehicle 200, limiting of an operation signal on the basis of the limit area L of the transport vehicle 200 may be released. In addition, in another embodiment, a limit release button or the like may be provided in the second operation device 531 of the remote operation room 500, and limiting of an operation signal on the basis of the limit area L may be released when the limit release button is pressed.

In the control device 540 according to the embodiment, although the case where the program p5 is stored in the storage 5300 has been described, the present invention is not limited thereto. For example, in another embodiment, the program p5 may be distributed to the control device 540 by a communication line. In this case, when the distributed program p5 is received, the control device 540 loads the program p5 in the main memory 5200, and executes the processing according to the program p5.

Further, the program p5 may be a program for realizing some of the above-described functions. For example, the program p5 may be a program for realizing the above-described functions in combination with another program p5 already stored in the storage 5300 or another program p5 embedded in another device.

Further, the control device 125, the management apparatus 300, and the control device 540 may include a programmable logic device (PLD) in addition to or instead of the configuration. Examples of PLD include a programmable array logic (PAL), a generic array logic (GAL), a complex programmable logic device (CPLD), and a field programmable gate array (FPGA). In this case, some of the functions realized by the processor may be realized by PLD.

INDUSTRIAL APPLICABILITY

According to the aspect, the control device can control the work equipment or the transport vehicle such that the work equipment and the transport vehicle do not come into contact with each other.

REFERENCE SIGNS LIST

1: Remote Operation System
100: Work Vehicle
200: Transport Vehicle
300: Management Apparatus
3101: Position Information Collection Unit
3102: Operation Signal Generation Unit
3103: Transmission Unit
3301: Traveling Route Storage Unit
3302: Position Information Storage Unit
500: Remote Operation Room
510: Driver's Seat
520: Display Device
530: First Operation Device
540: Control Device
5101: Vehicle Information Acquisition Unit
5102: Display Control Unit
5103: Position Information Acquisition Unit
5104: Route Acquisition Unit
5105: Area Setting Unit
5106: Work Equipment Position Specifying Unit
5107: Limit Determination Unit
5108: Operation Signal Input Unit
5109: Operation Signal Limiting Unit
5110: Operation Signal Output Unit
5111: Stop Signal Output Unit
5112: Operation Signal Overwriting Unit

The invention claimed is:

1. A control device that controls a work vehicle including work equipment which includes an arm, the control device comprising:
   a route acquisition unit that acquires a traveling route of a transport vehicle;
   an area setting unit that sets a limit area for limiting entry of the work equipment along the traveling route; and
   a signal output unit that outputs a signal for controlling the work vehicle or the transport vehicle on the basis of a relationship between the limit area and the work equipment,
   wherein the signal output unit outputs an operation signal for limiting an operation of moving the work equipment toward the inside of the limit area, and
   wherein the signal output unit outputs a stop signal for stopping the transport vehicle in a case where at least a part of the work equipment is present within the limit area.

2. The control device according to claim 1,
   wherein the signal output unit outputs an operation signal for moving the work equipment toward the outside of the limit area in a case where at least a part of the work equipment is present within the limit area.

3. The control device according to claim 2,
   wherein the signal output unit outputs a control signal for prohibiting swing of the work equipment in a case where a height of the work equipment is lower than a height of the limit area.

4. The control device according to claim 2,
   wherein the signal output unit outputs the signal on the basis of the relationship between the limit area and the work equipment in a case where the transport vehicle is located in a predetermined area in which the work vehicle is present.

5. The control device according to claim 1,
   wherein the signal output unit outputs a control signal for prohibiting swing of the work equipment in a case where a height of the work equipment is lower than a height of the limit area.

6. The control device according to claim 5,
   wherein the signal output unit outputs the signal on the basis of the relationship between the limit area and the work equipment in a case where the transport vehicle is located in a predetermined area in which the work vehicle is present.

7. The control device according to claim 1,
   wherein the signal output unit outputs the signal on the basis of the relationship between the limit area and the work equipment in a case where the transport vehicle is located in a predetermined area in which the work vehicle is present.

8. A control method performed by a control device comprising the steps of:
   providing a work vehicle which includes an arm and a transport vehicle;
   receiving a position of work equipment of the work vehicle; and
   outputting a signal for controlling the work equipment or the transport vehicle on the basis of a relationship between a limit area along a traveling route of the transport vehicle and the position of the work equipment,
   wherein the signal output unit outputs an operation signal for limiting an operation of moving the work equipment toward the inside of the limit area, and
   wherein the signal output unit outputs a stop signal for stopping the transport vehicle in a case where at least a part of the work equipment is present within the limit area.

* * * * *